Dec. 8, 1964  W. R. HARRELL  3,160,215
BLADE MOUNTING MEANS FOR A MULTIPLE PURPOSE BLADE
Filed Dec. 28, 1962  2 Sheets-Sheet 1

INVENTOR
Will R. Harrell
BY Jacobi & Davidson
ATTORNEY

INVENTOR
Will R. Harrell
BY
ATTORNEY

United States Patent Office 3,160,215
Patented Dec. 8, 1964

3,160,215
BLADE MOUNTING MEANS FOR A MULTIPLE PURPOSE BLADE
Will R. Harrell, St. Brides, Va.
Filed Dec. 28, 1962, Ser. No. 247,911
6 Claims. (Cl. 172—277)

This invention relates to earth working machinery, and more particularly to a bulldozer blade structure which may be conveniently substituted for the normally used scraping blade found on a bulldozer to provide cutting blades disposed below the surface of the ground to cut roots, stumps, or other objects disposed below the surface of the ground to permit removal of the same and subsequent working of the ground to facilitate farming or other operations.

Heretofore, the removal of roots, stumps and other objects imbedded in the ground preparatory to farming or other operations has been a time-consuming and laborious procedure, and in many instances the presence of such objects has resulted in serious damage to cultivating and other equipment. Various types of rotary cutters and other implements have heretofore been employed for this operation, but for many reasons these have not proved entirely satisfactory.

It is accordingly an object of the invention to provide a bulldozer blade structure which may be conveniently mounted on a conventional bulldozer and utilized to cut roots, stumps and other objects imbedded in the ground.

A further object of the invention is the provision of a bulldozer blade structure providing both vertical and horizontal cutting blades which operate below the surface of the ground, and serve to cut roots, stumps or other objects imbedded therein.

A still further object of the invention is the provision of a bulldozer blade structure having both vertical and horizontal cutting blades which may be conveniently raised and lowered by the conventional hydraulic cylinders normally provided on a bulldozer.

A still further object of the invention is the provision of a bulldozer blade structure having both vertical and horizontal cutting blades for operation below the surface of the ground, and with adjustably mounted ground-engaging wheels which operate to maintain the depth of the horizontal blade below the surface of the ground substantially constant, regardless of the nature of the terrain over which the apparatus is operated.

A further object of the invention is the provision of a bulldozer blade structure pivotally mounted on the conventional pusher frame of a bulldozer for movement about a vertical axis, and in which hydraulic cylinders or other suitable means are provided for moving the blade structure about a vertical axis to facilitate cutting operations in a straight path, and also during turns of the bulldozer in either direction.

A still further object of the invention is the provision of a bulldozer blade structure having both vertical and horizontal cutting blades for performing cutting operations below the surface of the ground, which blade structure may be conveniently and economically manufactured from readily available materials, and installed on a conventional bulldozer without modification thereof.

Further objects and advantages of the invention will be apparent from the following description taken in conjunction with the accompanying drawings, wherein.

Figure 1:
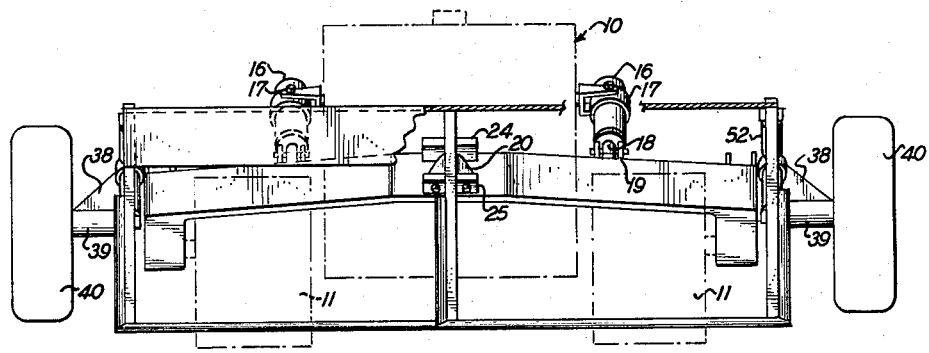
FIG. 1 is a front elevational view with parts broken away and in section for greater clarity, and showing a bulldozer blade structure constructed in accordance with this invention, and mounted on a conventional bulldozer which is shown in dotted outline.
Figure 4:
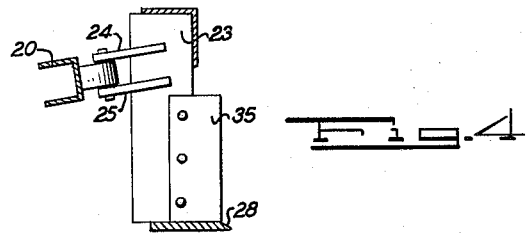
Figure 3:
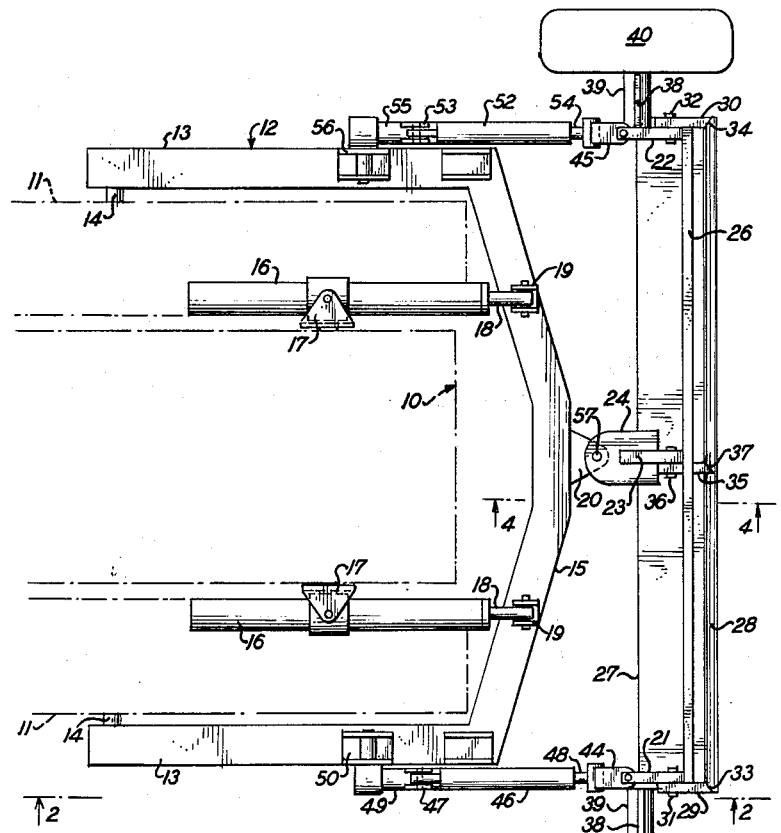

FIG. 3 a top plan view of the structure shown in FIG. 1; and,

FIG. 4 a sectional view taken substantially on the line 4—4 of FIG. 3, and showing the manner in which the blade structure is secured to the conventional pusher frame of the bulldozer.

With continued reference to the drawings, there is shown a bulldozer blade structure constructed in accordance with this invention for use on a conventional bulldozer 10 having ground-engaging caterpillar tracks 11 and a generally U-shaped pusher frame 12 having side bars 13 pivotally mounted at 14 on the bulldozer 10 for movement about a horizontal axis, and a forwardly disposed cross-bar 15. Hydraulic cylinders 16 are pivotally mounted on brackets 17 secured to the bulldozer 10, and the piston rods 18 of the hydraulic cylinders 16 are pivotally connected to brackets 19 secured to the cross-bar 15 of the pusher frame 12. Operation of the hydraulic cylinders 16 serve to pivotally move the pusher frame 12 about the pivotal mountings 14 to raise and lower the cross-bar 15 thereof. The cross-bar 15 of the pusher frame 12 is provided with a forwardly extending ear 20 disposed midway of the length of the cross-bar 15, and the purpose and operation of such ear 20 will be later described.

The blade structure of this invention may well comprise spaced vertical side members 21 and 22, and an intermediate vertical member 23. Secured to the intermediate member 23 are rearwardly extending vertically spaced lugs 24 and 25, the purpose of which will be later described. The vertical side members 21 and 22, and the intermediate vertical member 23 are connected adjacent the upper ends by a cross member 26, and a generally rectangular forwardly extending blade 27 is secured to the lower ends of the side members 21 and 22, and the intermediate member 23. The forward edge of the blade 27 is bevelled, as at 28, to provide a cutting edge. Vertical forwardly extending cutting blades 29 and 30 are removably secured by screw-threaded fastening means or the like 31 and 32 to the vertical side members 21 and 22, and the forward edges of the blades 29 and 30 are bevelled as at 33 and 34, respectively, to provide cutting edges. In a similar manner a vertical blade 35 is removably secured by screw-threaded fastening means or the like 36 to the intermediate vertical member 23, and the forward edge of the blade 35 is bevelled as at 37 to provide a cutting edge.

Figure 2:
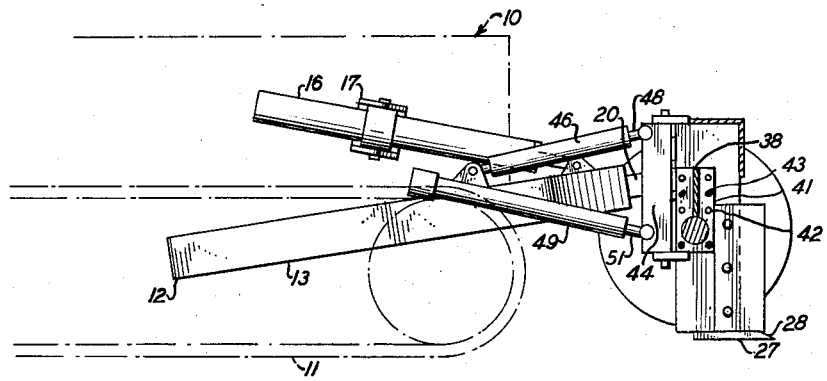
FIG. 2 is a side elevational view of the structure shown in FIG. 1 taken on the line 2—2 of FIG. 3 and with one ground-engaging wheel removed for greater clarity.

Brackets 38 having outwardly projecting stub axles 39 are provided for rotatably mounting ground-engaging wheels 40, and as best shown in FIG. 2 each bracket 38 includes a plate 41 having a plurality of vertically spaced apertures 42 therein for selectively receiving screw-threaded or other suitable fastening means 43 for adjustably securing the brackets 38 to the vertical side members 21 and 22. The purpose and operation of the ground-engaging wheels 40 will be later described.

Pivotally mounted on the rear edge of the vertical side member 21 for movement about a vertical axis is a plate 44, and in a similar manner a plate 45 is pivotally mounted on the rear edge of the vertical side member 22 for movement about a vertical axis. An upper hydraulic cylinder 46 is pivotally mounted on a bracket 47 secured to the side bar 13 of the pusher frame 12, and the piston rod 48 of the cylinder 46 is pivotally connected to the plate 44 adjacent the upper end thereof. A lower hydraulic cylinder 49 is pivotally mounted on a bracket 50 secured to the side bar 13 of the pusher frame 12, and the piston rod 51 of the cylinder 49 is pivotally connected to the plate 44 adjacent the lower end thereof. In a similar manner an upper hydraulic cylinder 52 is pivtally mounted on a bracket 53 secured to the opposite side bar 13 of the pusher frame 12, and the piston rod 54 of the cylinder 52 is pivotally connected to the plate 15 adjacent the upper end thereof. A lower hydraulic cylinder 55 is pivotally connected to a bracket 56 mounted on the opposite side bar 13 of the pusher frame 12, and the piston rod of the lower cylinder 55 is pivotally connected to the plate 45 adjacent the lower end thereof in the same manner as the piston rod 51 of the lower cylinder 49.

In operation, the blade structure of this invention is installed on the bulldozer by means of a king pin 57 extending through the lugs 24 and 25, and the forwardly extending ear 20 on the cross-bar 15 of the pusher frame 12, and of course the hydraulic cylinders 46, 49, 52 and 55 are connected to the pivotally mounted vertical plates 14 and 45, as described above. The blade structure may be held in upper inoperative position by operation of the hydraulic cylinders 16, and when it is desired to perform cutting operations, the blade structure may be lowered by operation of the hydraulic cylinders 16 at which time the horizontal blade 27 will enter the ground and penetrate therein to a depth determined by the position of the ground-engaging wheels 40 which, when in engagement with the ground will prevent further penetration of the horizontal blade 27, and will maintain the depth thereof substantially constant, regardless of the nature of the terrain over which the apparatus is operated. Forward movement of the bulldozer 10 will operate to push the horizontal blade 28 as well as the vertical blades 29, 30 and 35 through the ground, cutting roots, stumps or other objects imbedded in the ground to facilitate removal thereof, and subsequent working of the ground for farming or other operations. For normal straight forward movement, the blade structure will be positioned as shown in FIG. 3 but when in turning corners or in any other particular situations where it is desired to dispose the blade structure at an angle with respect to the axis of the bulldozer 10, the upper and lower hydraulic cylinders on opposite sides of the bulldozer may be operated to swing the blade structure about the king pin 57 in either direction, thereby disposing the blade structure at the desired angle. This will, of course, materially facilitate cutting operations when turning corners.

While the horizontal blade 27 is shown as permanently secured to the lower ends of the vertical members 21, 22 and 23, nevertheless, the same if desired may be removably secured thereto to permit removal for repair or sharpening, and the vertical blades 29, 30 and 35 may be removably secured as shown, or may be permanently fixed in position.

As will be seen from the above, there has been provided a bulldozer blade structure which may be conveniently and economically manufactured from readily available materials, and which may be installed on a conventional bulldozer without modification thereof, and which provides an apparatus materially facilitating the cutting of roots, stumps or other objects imbedded in the ground to prepare the same for subsequent working in farming or other operations, and the depth of cut is automatically controlled in accordance with the nature of the terrain, which also materially facilitates the cutting operation.

It will be obvious to those skilled in the art that various changes may be made in the invention, without departing from the spirit and scope thereof, and therefore the invention is not limited by that which is shown in the drawings and described in the specification, but only as indicated in the appended claims.

What is claimed is:

1. In combination a vehicle having a substantially U-shaped mounting frame pivotally supported on said vehicle about a horizontal axis, said U-shaped mounting frame comprising a pair of longitudinally extending members and a transverse cross member connecting the forward ends of said longitudinally extending members, hydraulic means connected at one end to said vehicle and at the other end thereof to said cross member for raising and lowering said U-shaped mounting frame about said horizontal axis, and a forwardly extending bracket on said cross member, the improvement comprising a blade structure, said blade structure having spaced vertical side members, a vertical intermediate member, vertically spaced rearwardly projecting lugs fixed to said intermediate member, a cross member connecting said vertical members adjacent the upper ends, a vertically disposed forwardly projecting cutting blade removably secured to each vertical member, each vertical blade being bevelled to provide a forward cutting edge, a generally rectangular horizontally disposed forwardly projecting cutting blade secured to the lower ends of said vertical members, said horizontal blade being bevelled to provide a forward cutting edge, a bracket adjustably secured for vertical movement on each side member, a stub axle projecting outwardly from each bracket, a ground-engaging wheel rotatably mounted on each axle with the ground-engaging surface of each wheel disposed above said horizontal blade at all times and above the ground when said mounting frame is in said raised position, means for pivotally connecting said lugs to said bracket on said mounting frame to provide for movement of said vertical blade and said horizontal blade about a first vertical axis, a plate pivotally mounted on the rear edge of each side member for movement about a second and third vertical axis respectively and a pair of upper and lower hydraulic cylinders each connected at their one ends, to the upper and lower ends of said plates and at their other ends to said longitudinally extending members of said mounting frame to move said blades about said first vertical axis, and to provide bracing means to prevent movement of said blades with respect to said pusher frame about a horizontal axis, said wheels being engageable with the ground when said U-shaped mounting frame is in said lowered position to maintain the depth of said horizontal blade below the ground substantially constant.

2. In combination a vehicle having a substantially U-shaped mounting frame pivotally supported on said vehicle about a horizontal axis, said U-shaped mounting frame comprising a pair of longitudinally extending members and a transverse cross member connecting the forward ends of said longitudinally extending members, hydraulic means connected at one end to said vehicle and at the other end thereof to said cross member for raising and lowering said U-shaped mounting frame about said horizontal axis, and a forwardly extending bracket on said cross member, the improvement comprising a blade structure, said blade structure having spaced vertical side members, a vertical intermediate member, vertically spaced and rearwardly projecting lugs fixed to said intermediate member, a cross member connecting said vertical members, a vertically disposed forwardly projecting cutting blade removably secured to each vertical member, each vertical blade being bevelled to provide a forward cutting edge, a horizontally disposed forwardly projecting cutting blade secured to the lower ends of said vertical members, said horizontal blade being bevelled to provide a forward cutting edge, a bracket adjustably secured for vertical movement on each side member, a stub axle projecting outwardly from each bracket, a ground-engaging wheel rotatably mounted on each axle with the ground-engaging surface of each wheel disposed above said horizontal blade at all times, means for pivotally connecting said lugs to said pusher frame to provide for movement of said vertical blades and said horizontal blade about a first vertical axis, a plate pivotally mounted on the rear edge of each side member for movement about a second vertical axis and means connected to said plates to move said blades about said first vertical axis, said wheels being engageable with the ground to maintain the depth of said horizontal blade below the ground substantially constant.

3. In combination a vehicle having a substantially U-shaped mounting frame pivotally supported on said vehicle about a horizontal axis, said U-shaped mounting frame comprising a pair of longitudinally extending members and a transverse cross member connecting the forward ends of said longitudinally extending members, hydraulic means connected at one end to said vehicle and at the other end thereof to said cross member for raising and lowering said U-shaped mounting frame about said horizontal axis, and a forwardly extending bracket on said cross member, the improvement comprising a blade structure, said blade structure having spaced vertical side members, a vertical intermediate member, vertically spaced rearwardly projecting lugs fixed to said intermediate member, a cross member connecting said vertical members, a vertically disposed forwardly projecting cutting blade secured to each vertical member, each vertical blade being bevelled to provide a forward cutting edge, a horizontally disposed forwardly projecting cutting blade secured to the lower ends of said vertical members, said horizontal blade being bevelled to provide a forward cutting edge, a bracket adjustably secured for vertical movement on each side member, a stub axle projecting outwardly from each bracket, a ground-engaging wheel rotatably mounted on each axle with the ground-engaging surface of each wheel disposed above said horizontal blade, means for pivotally connecting said lugs to said pusher frame to provide for movement of said vertical blades and said horizontal blade about a first vertical axis, a plate pivotally mounted on the rear edge of each side member for movement about a second vertical axis and means connected to said plates to move said blades about said first vertical axis, said wheels being engageable with the ground to maintain the depth of said horizontal blade below the ground substantially constant.

4. In combination a vehicle having a substantially U-shaped mounting frame pivotally supported on said vehicle about a horizontal axis, said U-shaped mounting frame comprising a pair of longitudinally extending members and a transverse cross member connecting the forward ends of said longitudinally extending members, hydraulic means connected at one end to said vehicle and at the other end thereof to said cross member for raising and lowering said U-shaped mounting frame about said horizontal axis, and a forwardly extending bracket on said cross member, the improvement comprising a blade structure, said blade structure having spaced vertical side members, a vertical intermediate member, a cross member connecting said vertical members, a vertically disposed forwardly projecting cutting blade secured to each of said vertical members, said vertical blades being bevelled to provide a forward cutting edge, a horizontally disposed forwardly projecting cutting blade secured to the lower ends of said vertical members, said horizontal blade being bevelled to provide a forward cutting edge, a bracket adjustably secured for vertical movement on each side member, a stub axle projecting outwardly from each bracket, a ground-engaging wheel rotatably mounted on each axle, means for pivotally connecting said blade structure to said pusher frame to provide for movement of said vertical blades and said horizontal blade about a vertical axis and means to move said blades about said vertical axis, said wheels being engageable with the ground to maintain the depth of said horizontal blade below the ground substantially constant.

5. In combination a vehicle having a substantially U-shaped mounting frame pivotally supported on said vehicle about a horizontal axis, said U-shaped mounting frame comprising a pair of longitudinally extending members and a transverse cross member connecting the forward ends of said longitudinally extending members, hydraulic means connected at one end to said vehicle and at the other end thereof to said cross member for raising and lowering said U-shaped mounting frame about said horizontal axis, and a forwardly extending bracket on said cross member, the improvement comprising a blade structure, said blade structure having spaced vertical side members, a vertical intermediate member, a cross member connecting said vertical members, a vertically disposed forwardly projecting cutting blade secured to each vertical member, each vertical blade being bevelled to provide a forward cutting edge, a horizontally disposed forwardly projecting cutting blade secured to the lower ends of said vertical members, said horizontal blade being bevelled to provide a forward cutting edge, a stub axle projecting outwardly from each side member, a ground-engaging wheel rotatably mounted on each axle, means for pivotally connecting said blade structure to said pusher frame to provide for movement of said vertical blades and said horizontal blade about a vertical axis and means to move said blades about said vertical axis, said wheels being engageable with the ground to maintain the depth of said horizontal blade below the ground substantially constant.

6. A blade structure adapted to be attached to a supporting vehicle for vertical movement with respect to the ground over which said vehicle and blade structure are moving, said blade structure comprising a cutter frame, said frame including spaced vertical side members, a vertical intermediate member, rearwardly projecting coupling bracket means fixed to said intermediate member, a cross member connecting said vertical members adjacent the upper ends, a vertically disposed forwardly projecting cutting blade removably secured to each vertical member, each vertical blade being bevelled to provide a forward cutting edge, a generally rectangular horizontally disposed forwardly projecting cutting blade secured to the lower ends of said vertical members, said horizontal blade being bevelled to provide a forward cutting edge, a bracket adjustably secured for vertical movement on each side member, a stub axle projecting outwardly from each bracket, a ground-engaging wheel rotatably mounted on each axle with the ground-engaging surface of each wheel disposed above said horizontal blade, means for pivotally connecting said coupling bracket means to a supporting vehicle for movement of said vertical blades and said horizontal blade about a first vertical axis, a plate pivotally mounted on the rear edge of each side member for movement about a second and third vertical axis respectively in response to a motor means on a supporting vehicle and each of said plates for swinging movement of said blade structure about said first vertical axis, said wheels being engageable with the ground so as to maintain the depth of said horizontal blade below the ground substantially constant.

References Cited in the file of this patent

UNITED STATES PATENTS

| | | |
|---|---|---|
| 2,190,347 | Austin | Feb. 13, 1940 |
| 2,446,512 | Miller | Aug. 3, 1948 |
| 2,814,134 | Forte | Nov. 26, 1957 |
| 2,952,322 | Jurcheck | Sept. 13, 1960 |
| 3,016,635 | Aston | Jan. 16, 1962 |
| 3,081,564 | Prater | Mar. 19, 1963 |

FOREIGN PATENTS

| | | |
|---|---|---|
| 695,707 | Great Britain | Aug. 19, 1953 |